April 26, 1949.　　　F. E. CREVER　　　2,468,546
REGULATING SYSTEM
Filed Sept. 28, 1946
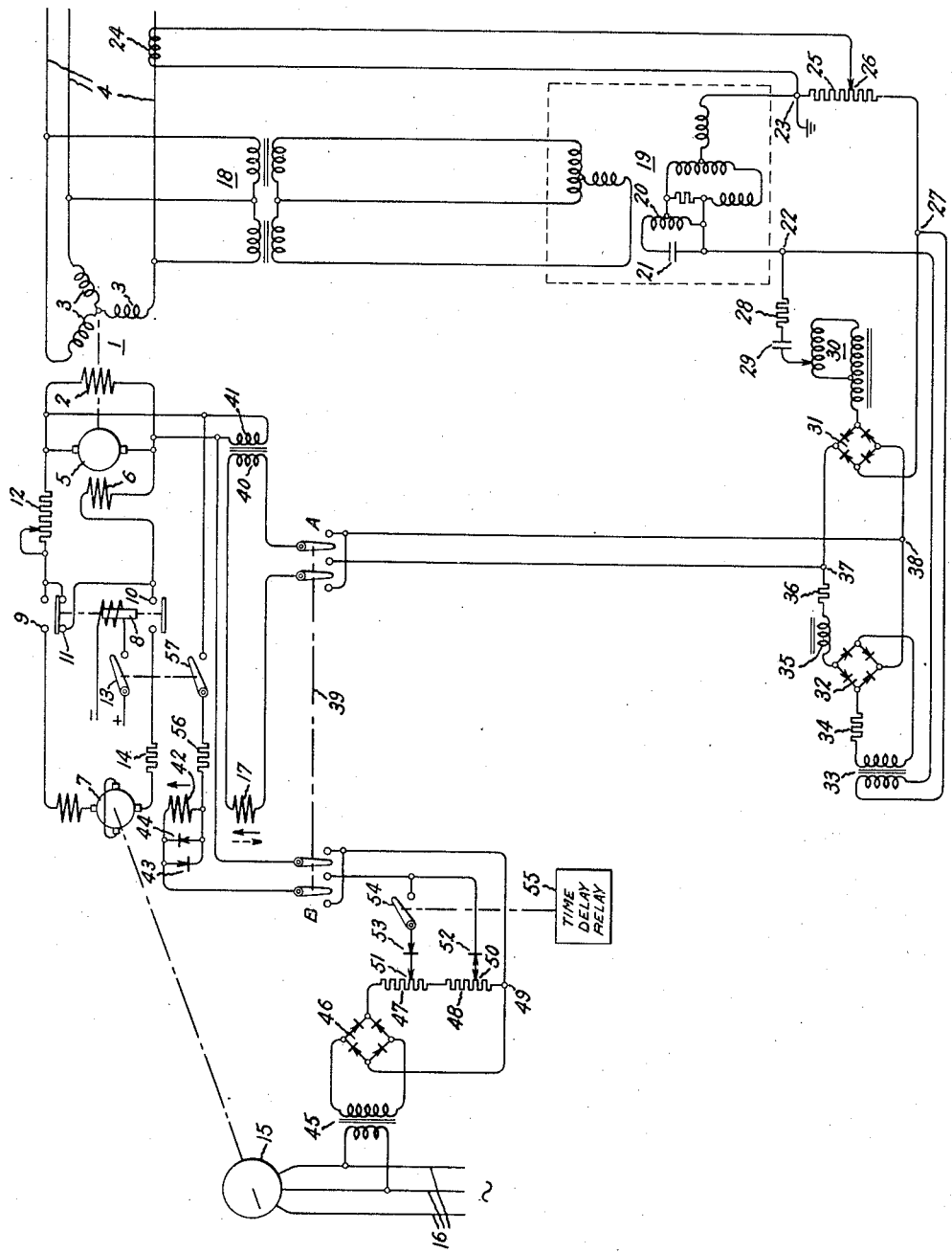
Inventor:
Frederick E. Crever,
by Prowell S. Mack
His Attorney.

Patented Apr. 26, 1949

2,468,546

UNITED STATES PATENT OFFICE 2,468,546

REGULATING SYSTEM

Frederick E. Crever, Scotia, N. Y., assignor to General Electric Company, a corporation of New York Application September 28, 1946, Serial No. 699,998

12 Claims. (Cl. 322—18)

1

This invention relates to a regulating system for dynamo-electric machines and more particularly to an automatic regulating system for synchronous generators or synchronous condensers interconnected with an alternating current power system.

In order to maintain proper operation of a synchronous machine which is interconnected with a power system, close regulation and control of the field excitation current of the machine is a necessity. The field excitation should be automatically regulated in accordance with electrical conditions existing on the interconnected system so that voltage and current stability of the synchronous machine will be maintained. It is advisable to provide a minimum limit to the field excitation so that field strength will not be reduced during system disturbances below the point at which synchronizing torque in the machine is dangerously weakened, thereby possibly resulting in the loss of synchronism of the alternating current machine and the interconnected system. A maximum limit should also be provided for field excitation so that the field windings will not be permitted to reach excessive temperatures due to abnormally high current flowing therein with a consequent deterioration of insulation and shortened life of the electrical apparatus.

It is an object of this invention to provide a new and improved regulating system for dynamo-electric machines.

Another object of this invention is to provide a new and improved automatic regulating system for synchronous machines of the alternating current generator or synchronous condenser type in which field excitation is continuously and automatically controlled in response to the existing electrical conditions of the machine.

It is a further object of this invention to provide an improved field excitation system for a synchronous dynamo-electric machine in which the field excitation is automatically controlled between a predetermined minimum value and a predetermined maximum value.

It is a still further object of this invention to provide an automatic regulating system for dynamo-electric machines of the synchronous generator type in which the generator field excitation is controlled between maximum and minimum limit values, and which also provides means for

2 rapid transition from automatic to manual control and vice versa.

This invention will be better understood from the following description taken in connection with the accompanying drawing, and its scope will be pointed out in the appended claims.

The single figure of the accompanying drawing is a diagrammatic illustration of a preferred embodiment of this invention as applied to a regulating system for a synchronous machine, and is equally applicable to alternating current generators or synchronous condensers.

Referring now to the drawing, I have shown a dynamo-electric machine 1 of the synchronous type which may be a conventional alternating current generator or synchronous condenser having a rotating field winding 2 and stationary armature windings 3. The armature windings 3 are connected to supply power, in the case of a generator, to the external power system 4, or in the case of a synchronous condenser, to receive power from the external power system 4. It should be understood that the synchronous machine 1 is also representative of a conventional synchronous condenser. The synchronous generator 1 is arranged to be driven by a prime mover (not shown), and the field winding 2 is connected to be energized by the direct connected D.-C. generator 5. The direct current generator 5 is arranged for self-excitation by means of the shunt field winding 6 and controlled by the rheostat 12, or it may be controlled from the amplidyne generator 7, the switching being accomplished by means of a solenoid operated contactor 8 and its associated normally open contacts 9 and 10 and normally closed contacts 11. Direct current energy for operating the contactor 8 may be taken from the substation battery (not shown), or any other convenient available source. When the contactor 8 is deenergized, as shown in the drawing, contacts 11 are closed removing the amplidyne generator 7 from the circuit, and the direct connected exciter 5 will operate as a self-excited exciter to supply current to the synchronous generator field winding 2. A rheostat 12 is provided in series with the exciter field winding 6 so that initial adjustments may be made in the exciter field current, and also to provide for manual control of field current if desired. When the solenoid-operated contactor 8 is energized from the source of direct current energy by closing the switch 13, contacts 9 and 10 will be closed and contact 11 will be open, and the circuit is thereby re-arranged so that the exciter field is controlled from the output of the amplidyne generator 7. A current limiting resistance 14 is provided in series with the amplidyne generator output in order to limit the maximum current to a safe value. The generator 7 is preferably of the direct axis compensated armature reaction excited type, and is characterized by its sensitivity and speed of response. The amplidyne generator 7 may, if desired, be direct connected to the main generator 1; however, in order to obtain maximum reliability of the field excitation supply I have shown the amplidyne generator 7 as arranged to be mechanically driven by a three phase induction motor 15 which is supplied with three phase energy, by means of the conductors 16, from another alternating current source, preferably not interconnected with the output circuit 4 of the main generator.

In order to regulate the field current of the main generator 1, the amplidyne generator 7 is provided with a reversible polarity control field winding 17, and the energizing current for the field winding 17 is regulated in response to the electrical condition existing at the output terminals of the generator 1 by means of a voltage sensitive circuit.

The voltage sensitive circuit comprises a three phase potential transformer 18, the primary winding of which is connected across the output circuit 4 of the alternator and the secondary of which is connected to the input terminals of the positive phase sequence voltage network, shown generally as 19. The positive phase sequence network 19 is effective to produce a single phase voltage, the magnitude of which is representative of the positive phase sequence voltages existing on the system 4. I prefer to use the particular positive phase sequence network as shown, and this network is fully described and claimed in my copending application Serial No. 538,933, filed June 6, 1944, now Patent 2,407,476, issued September 10, 1946, and assigned to the same assignee as this invention. Frequency compensation for the positive phase sequence network 19 is provided by means of the reactance 20 and the capacitor 21 in shunt relation therewith. Thus the single phase A.-C. voltage appearing across points 22 and 23 is proportional to the positive phase sequence voltages existing on the system 4 regardless of any unbalance existing in the separate phase voltages, and is also compensated for variations in system frequency.

If it is desired to compensate for line drop, or to provide a drooping generator characteristic necessary for parallel operation, a component proportional to alternator load current may be introduced. A current transformer 24 is inserted in one phase of the circuit 4 and the output of this current transformer is impressed across a portion of the resistor 25 which is in series with the output of the positive phase sequence network. Thus a voltage is developed between the points 23 and 26 which is proportional to line current flowing in the system 4 and this voltage is added to the voltage appearing across the points 22 and 23, so that their sum or the voltage appearing across the points 22 and 27 is composed of two components, one proportional to positive phase sequence voltages existing on the system 4 and the other proportional to line current flowing in the system 4.

In order to energize the control field 17 of the amplidyne generator 7 with a bucking or boosting flux so that a resultant increase or decrease of field excitation may be obtained, a nonlinear voltage sensitive circuit is provided which is energized from the voltage appearing across points 22 and 27. The nonlinear portion of this circuit includes the resistor 28, capacitor 29 and adjustable saturated reactor 30, all connected in series between the point 22 and one of the input terminals of the full wave rectifier bridge 31. The other input terminal of the rectifier bridge 31 is connected to point 27. The rectifier is thereby supplied with an alternating current value that varies nonlinearly with the alternating current voltage appearing across points 22 and 27 due to the saturation characteristics of the reactor 30 and the combination with the resistor 28, capacitor 29 in series therewith. The direct current output of the rectifier 31 therefore varies nonlinearly with the alternating current voltage appearing across points 22 and 27.

A second full wave rectifier bridge 32 is supplied with an alternating current voltage from the transformer 33 and resistor 34 that is directly proportional to the voltage appearing across the points 22 and 27. Due to the fact that there is only linear resistance drop in the resistor 34, the direct current output of the rectifier 30 will vary linearly with its applied alternating current voltage. The output terminals of rectifiers 31 and 32 are connected with cumulative polarity in a closed series circuit through the smoothing reactor 35 and resistance 36, and the circuit for energizing the control field winding 17 is connected in parallel with this circuit at the points 37 and 38. As long as the output currents of the rectifiers 31 and 32 are equal, no current will flow in the control field winding circuit but as soon as the rectifier output currents become unequal, the control field winding will be energized by the differential current and this current will flow in a direction depending on which rectifier is supplying the greater output current.

For purposes of illustration, assume that when the main line voltage at 4 is below normal, the action of the voltage sensitive circuit just described will then be to produce a current flow resulting in a boosting flux in the control field 17, as shown by the solid arrow alongside the field winding. This will, in turn, raise the output of the amplidyne generator 7, thus increasing the excitation of the field winding 2 of the main generator and tending to raise generator output voltage. Conversely, if the voltage across the points 22 and 27 is excessively high, representative of an excessive voltage condition existing on the system 4, the differential current in the rectifier circuit will be reversed and this differential current will be effective to energize control field 17 in the opposite or bucking direction, thereby reducing the output of the amplidyne generator and in turn reducing the excitation of the main generator field winding 2 with a consequent reduction in main generator output voltage.

The circuit for energizing the control field winding 17 includes one section A of a ganged reversing switch 39 for reversing the polarity of the amplidyne control field so that the exciter and generator field 2 may be operated with either polarity as desired. It is often the practice to periodically reverse the slip ring voltage of the A. C. machine to give increased brush life and less slip ring maintenance. A stabilizing or antihunt transformer is provided and has its secondary winding 40 connected directly in series with the control field winding 17 and its primary winding 41 connected in parallel with the main generator field winding 2. Thus changes in field will produce voltages in the circuit of the control field winding 17 which are of such direction as to counteract the change in exciter voltage and thus reduce oscillation or hunting of the excitation system.

The system as thus far described comprises an automatic voltage regulating system for a synchronous generator or synchronous condenser in which the terminal positive phase sequence voltage may be automatically maintained constant, or in which the vector sum of the positive phase sequence voltage and a component of voltage proportional to alternating current in the armature of the synchronous machine is maintained constant.

In order effectively to place a lower field excitation limit and an upper field excitation limit on the synchronous machine 1, a second control field winding 42 is provided for the amplidyne generator 7. In parallel relationship with the limit field winding 42, a pair of half wave selenium rectifier units 43 and 44 are provided and arranged for opposite polarity, thereby acting as a nonlinear resistance shunt and preventing excessive current flow through the field winding 42 in the event excessive voltages are developed in the field excitation circuit.

A constant direct current voltage, which serves as a reference level for determining the minimum voltage at which the control field winding 42 will be energized and also the maximum voltage for energization of this control field winding, is obtained by rectification of the output of the constant potential transformer 45 which has its primary winding connected to a relatively constant voltage source of alternating current, such as the supply line 16 of the induction motor drive 15. The constant voltage output of the transformer 45 is supplied to a full-wave rectifier bridge 46, and the direct current output of the rectifier is passed through a pair of voltage adjusting rheostats 47 and 48 in series circuit relationship. Thus a definite value of voltage corresponding to the desired minimum field excitation voltage may be selected between the points 49 and 50, and a second reference value of voltage corresponding to the maximum field excitation voltage desired, is established across the points 49 and 51. The control field winding 42 is energized by comparing the alternator field voltage with the voltage appearing across the points 49 and 50, and when the alternator field voltage is less than the voltage across the points 49 and 50, current is passed through the unidirectional current conducting device 52 and through the control field winding 42 in a direction to boost or raise excitation of the amplidyne generator, thereby raising the field excitation of the main generator 1.

To provide the maximum field excitation voltage limit, the voltage across the alternator field 2 is compared with the reference voltage across the points 49 and 51, and when the alternator field voltage exceeds the reference voltage across the points 49 and 51 the unidirectional current conducting device 53 permits current to flow through the control field winding 42 in the opposite direction or in a direction effective to produce a bucking flux in the amplidyne generator, thereby reducing exciter output with a consequent reduction in excitation of the generator field winding 2. In the voltage comparison circuit for the maximum field excitation limit, a normally open switch 54 is provided in series with the control field winding 42, and the switch 54 is mechanically operated by means of a time delay relay 55. The time delay relay 55 may be of any conventional type suitable for this application and may be made operative in response to excessive temperature in the generator armature winding 3, field winding 2, or may be constructed so that it will operate after a definite time delay from the time that the alternator field voltage reaches the allowable maximum. Instantaneous operation of the maximum limit is not desirable since it is preferable to allow the main machine 1 to attempt to stabilize itself during transient conditions and only impose the maximum field limit if stability is not restored after a predetermined interval of time. Thus a predetermined time interval after the field excitation voltage has exceeded the permissible maximum, the time delay relay 55 will operate and close the switch 54, thus permitting energization of the control field in a bucking direction to reduce the field excitation voltage. A current adjusting resistor 56 is placed in series with the control field winding 42 to prevent excessive flow of current through the control field winding. The "off-on" switch 57, also in series with the control field winding, assures that the limit field winding 42 will be in operative condition whenever the amplidyne generator 7 is connected in the field excitation supply circuit, since the switch 57 is mechanically interlocked with switch 13 which energizes the solenoid contactor 8 to insert the amplidyne generator in the main field excitation circuit.

The reversing switch 39 has a second section B as shown, and is effective to reverse the direction of excitation limit field 42 at the same time that the normal voltage regulating field 16 is reversed. This will insure that irrespective of the polarity with which the exciter system builds up when the system is first placed in operation, the voltage control field 17 and the excitation limit field 42 will be maintained with proper respective polarities, and the polarities of both may be simultaneously reversed by means of the switch 42 in the event it is desired to reverse exciter voltage polarity.

In placing the system in automatic operation it is, of course, necessary to close the ganged switches 13 and 57, which places the amplidyne output in circuit to supply the generator field exciter 5. The polarity with which the exciter builds up depends upon the position of the polarity reversal switch 39.

The operation of the system has been rather completely described previously. However, it should be again pointed out that the system normally operates to maintain constant terminal voltage of the main generator 1. The excitation limit field 42 is effective to prevent field excitation from being reduced below a predetermined minimum, and thereby excitation is maintained on the generator so that sufficient synchronizing torque is always available to prevent loss of synchronism between the synchronous machine 1 and the interconnected system 4. The same limit field 42 also functions in the case of an attempt by the automatic regulator to provide excessive generator field current, by operating, after a predetermined time delay, to reduce generator field excitation to a value consistent with the heating capacity of the generator field and terminal voltages existing on the generator. Thus it can be seen that once the system is placed in operation, the aforementioned regulating characteristics are automatically obtained and no further adjustment or manual control is necessary. The provision of the automatic maximum and minimum field excitation limits insures that the synchronous machine will be maintained in operation during system disturbances which otherwise might cause loss of synchronism or a complete shutdown of the synchronous machine.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A regulating system for a dynamo electric machine having a field winding comprising, excitation means for energizing said field winding, means responsive to a first electrical condition of said machine for continuously regulating said excitation means to maintain constant said conditions, means for limiting said field excitation between predetermined maximum and minimum values, and means responsive to a second electrical condition of said machine for modifying the maximum limit value of said first condition responsive means after a predetermined time interval.

2. A regulating system for a synchronous machine having a field winding comprising, excitation means for energizing said field winding, means responsive to an electrical voltage condition of said machine for continuously regulating said excitation means to maintain constant said voltage condition, means for limiting said field excitation to a predetermined minimum value, and means associated with said limit means and responsive to an electrical current condition in said machine for limiting the maximum value of excitation to said field winding after a predetermined period of time thereby preventing damage to said machine by said maximum value of excitation.

3. A regulating system for a synchronous generator having a field winding comprising, excitation means for said field winding, means responsive to the terminal voltage of said generator for continuously regulating said excitation means to maintain constant said terminal voltage, control means for limiting said field excitation between predetermined fixed maximum and minimum values, and means responsive to the output current of said generator for modifying the voltage setting of said voltage responsive means.

4. A regulating system for a synchronous generator having a field winding comprising, excitation means for said field winding, means responsive to the terminal voltage of said generator for continuously regulating said excitation means to maintain constant said terminal voltage, control means for limiting said field excitation between predetermined fixed maximum and minimum values, means responsive to the output current of said generator for modifying the voltage setting of said voltage responsive means, and time delay means for rendering said control means partially ineffective thereby to prevent damage to said machine by excessive excitation of said field winding for a time interval in excess of a predetermined period of time.

5. A regulating system for a dynamo electric machine having a field winding comprising, excitation supply means for said field winding, automatic regulating means responsive to a first electrical condition of said machine for continuously regulating said excitation supply means to maintain said machine terminal voltage substantially constant, first limiting means for rendering said regulating means ineffective to reduce field excitation below a predetermined value, and second limiting means associated with said first limiting means and responsive to a second electrical condition of said machine for preventing said regulating means from increasing field excitation above a predetermined value, said second limiting means being operative after a predetermined time delay.

6. A regulating system for a dynamo electric machine having a field winding comprising, excitation supply means for said field winding, automatic regulating means responsive to terminal voltage on said machine effective continuously to regulate said excitation supply means to maintain said machine terminal voltage substantially constant, first limiting means for rendering said regulating means ineffective to reduce field excitation below a predetermined value, second limiting means associated with said first limiting means and responsive to an electrical condition of said machine for preventing said regulating means from increasing field excitation above a predetermined value, said second limiting means operative after a predetermined time delay, and means responsive to machine load current for modifying the setting of said automatic voltage responsive regulating means.

7. A regulating system for a synchronous generator having a field winding comprising, excitation supply means for said field winding, automatic regulating means responsive to terminal voltage of said generator for continuously regulating said excitation supply means to maintain said generator terminal voltage substantially constant, first control means responsive to an electrical voltage condition of said machine field winding for rendering said regulating means ineffective to reduce field excitation below a predetermined value, second control means associated with said first control means and responsive to said electrical voltage condition of said machine field winding for preventing said regulating means from increasing field excitation above a predetermined value, said second control means being operative after a predetermined time interval, and generator current responsive means coacting with said voltage responsive regulating means and effective to modify the voltage setting of said voltage responsive regulating means in response to changes in generator current.

8. In combination, a synchronous dynamo electric machine, a field winding therefor, field excitation means for said machine including a dynamo electric exciter having a first control field winding, machine voltage responsive means associated with said first control field winding and effective to vary the excitation of said first control field winding to maintain constant said machine voltage, a second control field winding for said exciter, means associated with said second control field winding responsive to machine field winding voltage for energizing said second control field winding to render ineffective said first control field winding from lowering said machine field winding voltage below a predetermined value or from raising said machine field winding voltage above a predetermined value, and means for delaying said voltage lowering action of said second control field winding for the definite time interval after said machine field winding voltage attains its predetermined maximum allowable value.

9. In combination, a synchronous dynamo electric machine, a field winding therefor, field excitation means for said machine including a direct current exciter having a first control field winding, machine voltage responsive means associated with said first control field winding and effective to vary the excitation of said first control field winding to maintain constant said machine voltage, a second control field winding for said exciter, means associated with said second control field winding responsive to machine field winding voltage for energizing said second control field winding to render ineffective said first control field winding from lowering said machine field winding voltage below a predetermined value or from raising said machine field winding voltage above a predetermined value, means for delaying said voltage lowering action of said second control field winding for a definite time interval after said machine field winding voltage attains its predetermined maximum allowable value, and means responsive to machine load current for modifying the setting of said machine voltage responsive means.

10. In combination, a synchronous generator, a field winding therefor, field excitation means for said generator including a direct current exciter having a first control field winding, voltage responsive means associated with said first control field winding and effective to vary the excitation of said first control field winding to maintain constant said generator voltage, a second control field winding for said exciter and opposed in polarity to said first control field winding, means associated with said second control field winding responsive to said generator field winding voltage for energizing said second control field winding to render ineffective said first control field winding from lowering said generator field winding voltage below a predetermined value or from raising said generator field winding voltage above a predetermined value, and means for delaying said voltage lowering action of said second control field winding for a definite time interval after said generator field winding voltage attains its predetermined maximum allowable value, and means responsive to generator load current for inversely varying the setting of said generator voltage responsive means.

11. A regulating system for a dynamo-electric machine interconnected with a power circuit comprising, a field winding for said machine, a direct current exciter for energizing said field winding, a reversible polarity control winding for said exciter, automatic regulating means responsive to power circuit voltage including a positive phase sequence network connected to said power circuit and a nonlinear voltage sensitive circuit interposed between said positive phase sequence network and said control field winding, first limiting means for rendering said control field winding ineffective to reduce field excitation below a predetermined value, and second limiting means coacting with said control field winding for rendering said control field winding ineffective to increase field excitation above a predetermined value.

12. A regulating system for a synchronous dynamoelectric machine interconnected with a polyphase power circuit comprising, a field winding for said machine, a direct current exciter for energizing said field winding, a reversible polarity control winding for said exciter, automatic regulating means responsive to power circuit voltage including a positive phase sequence network connected to said polyphase power circuit and a nonlinear voltage sensitive circuit interposed between said positive phase sequence network and said control field winding, first limiting means for rendering said control field winding ineffective to reduce field excitation below a predetermined value, and second limiting means coacting with said control field winding for rendering said control field winding ineffective to increase field excitation above a predetermined value, and time delay means for disabling said second limiting means for a predetermined period of time after said field excitation has attained a predetermined maximum value.

FREDERICK E. CREVER.

REFERENCES CITED

The following references are of record in the file of this patent:

UNITED STATES PATENTS

| Number | Name | Date |
|--------|------|------|
| 1,743,797 | Nickle | Jan. 14, 1930 |
| 1,971,808 | Bergvall | Aug. 28, 1934 |

Certificate of Correction

Patent No. 2,468,546.  April 26, 1949.

FREDERICK E. CREVER

It is hereby certified that errors appear in the printed specification of the above numbered patent requiring correction as follows:

Column 6, line 73, after the word "generator" and before the period, insert *armature*; column 8, line 31, claim 6, before "operative" insert *being*;

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*